United States Patent [19]
Georgopoulos et al.

[11] Patent Number: 5,413,393
[45] Date of Patent: May 9, 1995

[54] REUSABLE SEAL FOR USE WITH ROD

[75] Inventors: George Georgopoulos, Pine Brooks; Richard C. Dreisbach, North Arlington, both of N.J.

[73] Assignee: E.J. Brooks Company, Newark, N.J.

[21] Appl. No.: 106,428

[22] Filed: Aug. 13, 1993

[51] Int. Cl.$^6$ ............................................. B65D 33/34
[52] U.S. Cl. ..................... 292/327; 292/318
[58] Field of Search ............... 292/327, 326, 318, 319, 292/320, 313; 411/910

[56] References Cited

U.S. PATENT DOCUMENTS

| | | |
|---|---|---|
| 889,776 | 6/1908 | Dyer . |
| 1,388,716 | 8/1921 | Hughes . |
| 1,577,678 | 4/1925 | Behrman . |
| 2,118,666 | 5/1938 | Dibner . |
| 2,144,050 | 1/1939 | Fotsch . |
| 2,148,173 | 2/1939 | Rogoff . |
| 2,161,694 | 6/1939 | Becker . |
| 2,294,398 | 9/1942 | Ferguson . |
| 2,988,727 | 6/1961 | Berndt . |
| 3,374,511 | 3/1968 | Barker . |
| 3,852,850 | 12/1974 | Filhaber . |
| 3,868,748 | 3/1975 | Kelly . |
| 3,951,143 | 4/1976 | Barnaby ........................ 292/327 |
| 3,975,040 | 8/1976 | Van Gompel .................. 292/318 |
| 3,980,337 | 9/1976 | Moberg et al. ................. 292/319 |
| 3,994,521 | 11/1976 | Van Gompel . |
| 4,418,952 | 12/1983 | Wallet ............................ 292/327 |
| 4,626,009 | 12/1986 | Burnett et al. ................. 292/327 |
| 4,722,562 | 2/1988 | Burt .............................. 292/318 |
| 5,005,883 | 4/1991 | Guilen ........................... 292/327 |
| 5,127,687 | 7/1992 | Guiler . |
| 5,131,796 | 7/1992 | Herum et al. ................. 411/910 |
| 5,222,776 | 6/1993 | Georgopoulos et al. . |

OTHER PUBLICATIONS
Brooks Catalog 89014.

*Primary Examiner*—Peter M. Cuomo
*Assistant Examiner*—Monica E. Millner
*Attorney, Agent, or Firm*—William Squire

[57] ABSTRACT

A self locking reusable rod seal includes a case hardened stamped frustro-conical member comprising a C-shaped section from which two like opposing arcuate segments are cantilevered. The member is located and secured for axial displacement in a frustro-conical bore of a case hardened steel housing. The segments have axially spaced ridges, the end most ones of which grip a rod in the bore thereof, the rod axially displacing the member when the rod is displaced in opposite directions relative to the housing. The rod has circumferential axially spaced grooves. The member ridges engage the grooves so as to be pulled by the axial displacement of the rod. The ridges and grooves are resiliently engaged and when the member is displaced toward one end of the housing bore, the ridges disengage and when the member is displaced toward the other end of the bore, the ridges are wedged against the rod grooves. The rod has a head at one end which with the seal lock a hasp therebetween by limiting displacement of the rod toward the one housing bore end.

24 Claims, 3 Drawing Sheets

REUSABLE SEAL FOR USE WITH ROD

CROSS REFERENCE TO RELATED APPLICATIONS

Of interest are commonly owned copending applications each entitled Cable Seal Ser. No. 065,471 filed May 21, 1993 and Ser. No. 073,529 filed Jun. 8, 1993 both in the name of the present inventors.

1. Field of Invention

This invention relates to reusable seals for locking a rod thereto.

2. Background of the Invention

Cable seals are in wide use and comprise a self-adjusting cable gripping unit which automatically adapts itself to gripping a stranded cable. In such use, a cable is typically formed with a swaged flag at one end to form an integral head member for the cable end. The other end of the cable is free. The cable free end is slipped or otherwise passed through an opening of a structure to be locked, for example, two hasps of a lock arrangement.

After the cable is slipped through the hasps or other lock arrangement, the cable gripping unit, which includes a housing and gripping segments, receives the free end of the cable and the cable is slid through the housing which has a frustro-conical bore therein including a somewhat frustro-conical cable gripping segments within the bore which spread apart and slide over the cable as the housing is slid along the cable in one direction relative to the cable. When the unit reaches a desirable position adjacent to the hasp or other structure to which the cable is to be locked, the unit is left in place at that location. Any attempt to remove the unit by sliding the unit in a reverse direction along the cable is precluded by the gripping segments which are spring loaded toward a locking direction by a compression spring in the bore. If an attempt is made to displace the housing in the reverse direction relative to the cable, the cable is frictionally gripped by the gripping segments as the cable is displaced and the gripping segments assisted by the spring wedge against the cable and housing, locking the cable thereto. The housing and the flag lock the cable and the hasps together. Reference is made to the aforementioned patent applications with respect to further discussion of the prior art and specific patents related to this subject matter. These patents include U.S. Pat. Nos. 3,852,850; 3,868,748; 3,994,521; 899,776 and 1,577,678. These all relate to cable gripping structures for gripping flexible stranded cables.

In the aforementioned application Ser. No. 073,529, a resilient structure employing flexible fingers on a pair of opposing segments including a spring for urging the structure in a cable gripping direction is disclosed for gripping both stranded cables and a rigid rod. However, the present inventors, who are the same as in that prior application, have discovered that the flexible gripping fingers of the gripping structure therein do not grip the rod as securely as they grip a stranded cable. The rod is relative hard, e.g., steel, and smooth. However, even with annular grooves, the rod is sufficiently hard and smooth so as to preclude the desired gripping action. Apparently the softer and relatively rough surface of a stranded cable is easier to grip than a hard steel rod. The rigid rod is desirable, especially when made of hard material such as steel, for providing enhanced security in certain implementations as compared to stranded cable. The present invention is an improvement of the structure disclosed in application Ser. No. 073,529 for providing enhanced gripping of a rod. Also, the prior structures include a spring in the housing which spring adds length to the seal housing and cost.

The present inventors recognize a need for a low cost compact locking device for securing a rod without the need for an additional spring.

SUMMARY OF THE INVENTION

A locking device for securing a pair of hasps and the like according to the present invention comprises an elongated cylindrical rod having a longitudinal axis and a head secured thereto. The rod has an array of axially spaced circumferential grooves of like dimension, each groove having first and second side walls. A housing is included and has a bore therethrough for receiving the rod, at least a portion of the bore being frustro-conical. The bore has a larger proximal end and a smaller distal end. A rod clamping member is in the bore and has an arcuate section of sufficient angular extent so as to receive and be retained on the rod in a direction transverse the axis and for displacement on the rod along the axis. At least one segment is cantilevered from the section toward the bore distal end, the section and segment lying on a frustro-conical surface of revolution. The clamping member has a first lock position and a second unlock position in the housing bore, the first position being closer to the distal end than the second position. The at least one segment at an end distal the section has at least one ridge facing and in engagement with one of the rod grooves. Each ridge has third and fourth side walls for engaging a groove respective corresponding first and second side walls. The resilient radial force of the ridge on the engaged groove is of such a magnitude and the engaged walls being so arranged such that axial displacement of the rod causes the engaged ridge to be pulled by the rod in first and second opposing directions. The housing bore and member dimensions are such that, when the member is pulled in the first direction to the first locked position, the housing radially locks the ridge in the rod groove and, when the member is pulled in the second direction to the second unlocked position by the rod, the ridge is free to resiliently radially disengage from that groove in response to further relative axial displacement of the rod in the second direction, the head being dimensioned and located to provide limited relative displacement of the rod in the second direction. The housing is dimensioned for precluding displacement of the member beyond the first and second positions in the bore.

In accordance with a preferred embodiment, the clamping member comprises hardened sheet metal formed from a flat sheet by stamping. This provides a relatively simple low cost locking arrangement without the need for additional retaining means such as a spring.

DESCRIPTION OF THE PREFERRED EMBODIMENTS

Figure 1:
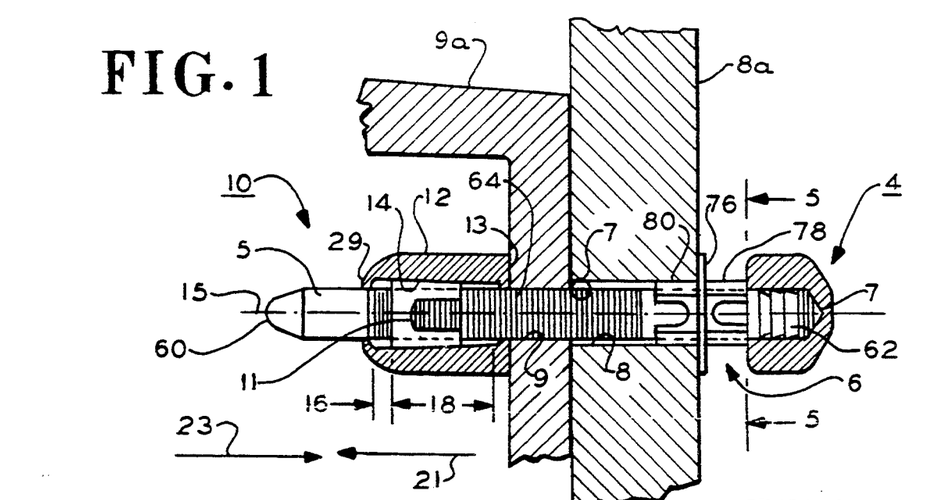
FIG. 1 is a side elevation sectional view of a seal device in accordance with one embodiment of the present invention.

In FIG. 1, seal device 10 comprises a steel housing 12 preferably case hardened, having a longitudinal bore 14 on axis 15. A case hardened steel gripping member 11 is in bore 14 and is displaceable along axis 15 in bore 14 in directions 21 and 23. Rod assembly 4 comprises a steel circular cylindrical rod 5, which is relatively softer than member 11, a thermoplastic molded spacer 6 and a head 7 permanently frictionally secured to an end of rod 5. Rod 5 passes through aligned bores 8 and 9 of hasps 8a and 9a, respectively, which are to be locked together by relatively larger head 7 and housing 12. Spacer 6 fits within bore 8 of hasp 8a. Member 11, housing 12 and rod 5 are arranged to permit the rod 5 to displace axially along axis 15 in direction 21 relative to member 11 and housing 12, but lock the rod 5 so that it can not displace in direction 23 opposite direction 21 relative to member 11 and housing 12. This locking action will be described in more detail below.

Figure 8:
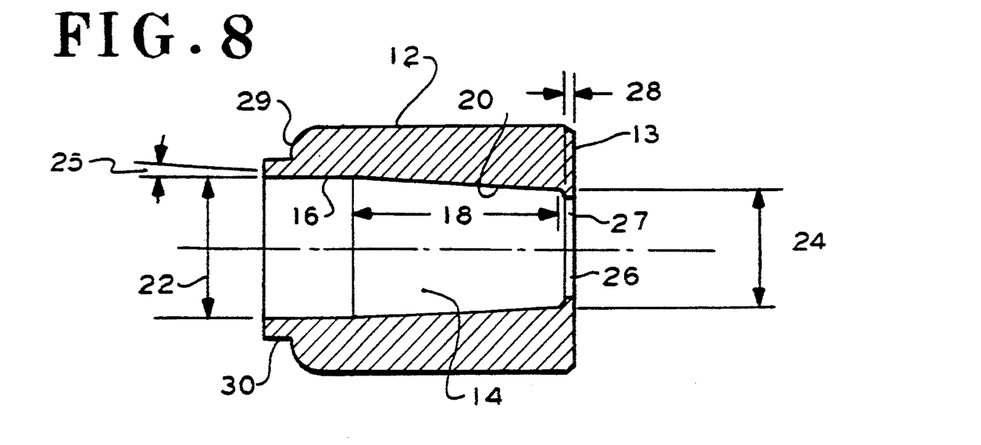
FIG. 8 is a side elevation sectional view of the housing employed in the device of FIG. 1.

In FIG. 8, housing 12 bore 14 has a circular cylindrical surface 16 and a frustro-conical portion 18 having a surface 20. Surfaces 16 and 20 are concentric about axis 15, Surface 20 is at an angle 25 relative to axis 15, preferably 3°. Surface 20 has a larger diameter 22 at proximal end 29 which diameter extends from surface 16 also of diameter 22, and tapers to a narrower diameter 24 at end 13 distal end 29. A circular radially inwardly extending shoulder 26 forms an opening of reduced diameter at end 13. Shoulder 26 has an axial width 28 with a circular cylindrical surface 27 concentric about axis 15. Bore 14 is open to the ambient at both ends.

The housing 12 at end 29 has an axial extending circular flange 30. After the gripping member 11 of FIG. 1 is inserted in bore 14, the flange 30 is swaged to a reduced diameter the same as shoulder 26, FIG. 1, to lock the member 11 in the bore 14, the diameter 24 also being sufficiently small to prevent the member 11 from displacing through the bore 14 at end 13. Thus, the member 11 cannot be removed from the bore 14 at either end.

Figure 2:
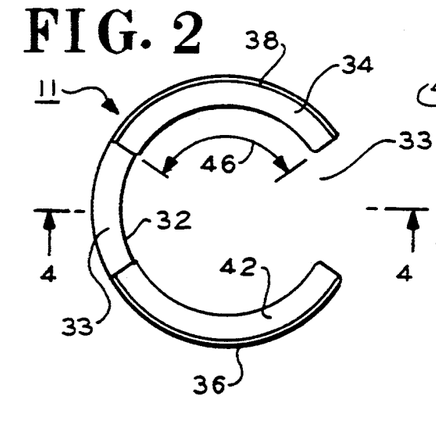
FIG. 2 is an end elevational view of the gripping member in the embodiment of FIG. 1.
Figure 3:
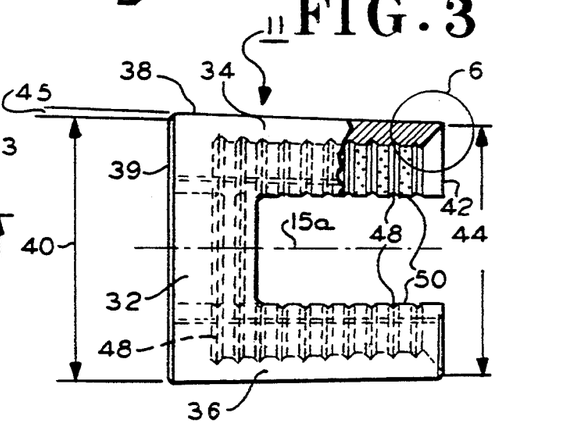
FIG. 3 is a side elevation view, partially in section, of the member of FIG. 2.
Figure 4:
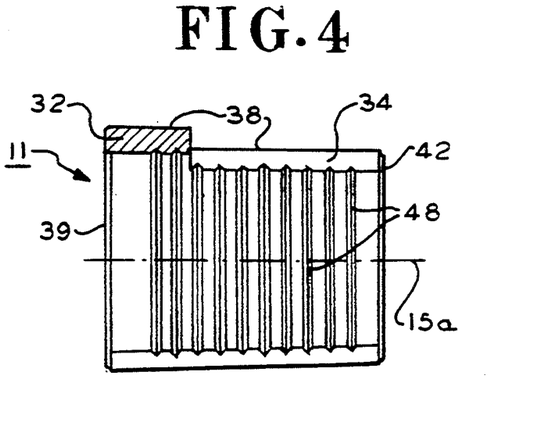
FIG. 4 is a sectional view of the member of FIG. 2 taken along lines 4—4.

In FIGS. 2, 3 and 4, gripping member 11 comprises stamped sheet metal having a frustro-conical configuration. The member 11 is of a uniform thickness throughout. The member 11 comprises a C-shaped frustro-conical section 32 from which are cantilevered two mirror image identical frustro-conical segments 34 and 36 which are diametrically opposite one another. Representative segment 34 will be described in more detail below. The segments 34 and 36 form with section 32 an integral frustro-conical member. The member 11 has a smooth frustro-conical outer surface 38. Larger end 39 has a diameter 40. The smaller end 42 has a diameter 44. The member 11 is concentric relative to axis 15a which is co-axial with axis 15 of the housing 12 when assembled. The length of the member 11 along axis 15a relative to the difference in diameters 40 and 44 is such that the surface 38 subtends an angle 45 with axis 15a, preferably about 1.5°. The relationship of angle 45 of member 11 to the angle 25 of bore 14 of the housing 12 is important.

Section 32 has an axial length of approximately one-fourth the axial length of member 11. Thus the segments 34 and 36 extend cantilevered from section 32 an axial extent approximately three times the axial extent of section 32. In one embodiment, the member 11 has an axial length of 0.5 inches (12.7 millimeters). In this embodiment, the member 11 diameter 40 may be about 0.488 inches (12.4 millimeters). The axial extent dimension relative to the larger diameter 40 of member 11 is important to preclude the member 11 from tumbling inside the bore 14. By way of example, the housing 12 may have a diameter 22 also of about 0.5 inches (12.7 millimeters). In comparison, the housing 12 bore 14 surface 20 may have an axial length of about 0.770 inches (19.6 millimeters), whereas surface 16 may have an axial extent of about 0.1 inches (2.54 millimeters). These relative dimensions are important.

In FIG. 2, the segment 34 subtends an angle 46, preferably an angle of about 110°. The spacing 33 between the segments 34 and 36 each subtend an angle preferably of about 60°. These angles may differ in accordance with a given implementation. In FIGS. 3 and 4, the Segments 34 and 36 and section 32 have an array of arcuate identical aligned grooves 48. The grooves 48 each lie in a plane, the planes being parallel. The grooves 48 in section 32 extend completely around the section 32.

Figure 6:
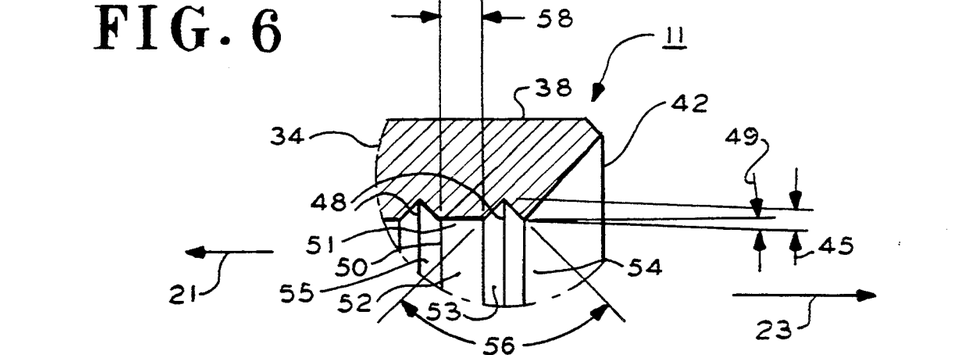
FIG. 6 is a sectional, more detailed view of a portion of the member of FIG. 3 taken at region 6.

In FIG. 6, adjacent grooves 48 define a ridge 50. The surface of each ridge 50 crest 51 has an axial extent and is parallel to the segment 34 external surface 38. Thus, the crests of the ridges 50 lie on a frustro-conical surface of revolution. The tooth 54 adjacent to end 42 may have a sharp crest as shown.

The grooves 48 are all identical and are defined by side walls which subtend an angle 56, preferably 90°, each side wall being about 45° relative to axis 15a. The side walls may lie in a range of 30°-60° with respect to axis 15a which is not important. The crest to root depth of each ridge 50 is preferably 0.01 inches (approximately 0.25 millimeters) but may lie in a range of 0.005-0.020 inches. The grooves 48 each preferably have a maximum axial extent in this embodiment of about 0.020 inches (0.5 millimeters). The crest 51 of each ridge 50 has a transverse width 58 extending in the axial extent of axis 15a, FIG. 3. The magnitude of the ridge 50 width 58 at its crest is not critical. In this embodiment, the width 58 may have a dimension of 0.020 inches (0.5 millimeters). The steepness of the side walls of each ridge 50 relative to axis 15a and the transverse width 58 of each ridge 50 are important only relative to the dimensions of the grooves 64 in the rod 5 for performing the desired function as will be explained.

The rod 5, FIG. 1, is an elongated circular cylinder and has a somewhat conical tip 60. The other end of the rod 5 has an axially extending array of serrations 62. Each of the serrations 62 comprises an annular groove extending about the peripheral surface of the rod 5. Each serration comprises an inclined surface which terminates in a forward most outer edge in direction 21 which lies in a plane perpendicular to axis 15. The roots of each of the serrations is sufficiently deep to provide a weakening region of the rod 5 for severing the rod at a serration in a manner to be described. A head 7, preferably steel, a circular cylinder, is force fitted onto the end of the rod 5 over the serrations 62 so as to permanently secure the head 7 to the rod 5.

Figures 7, 7A:
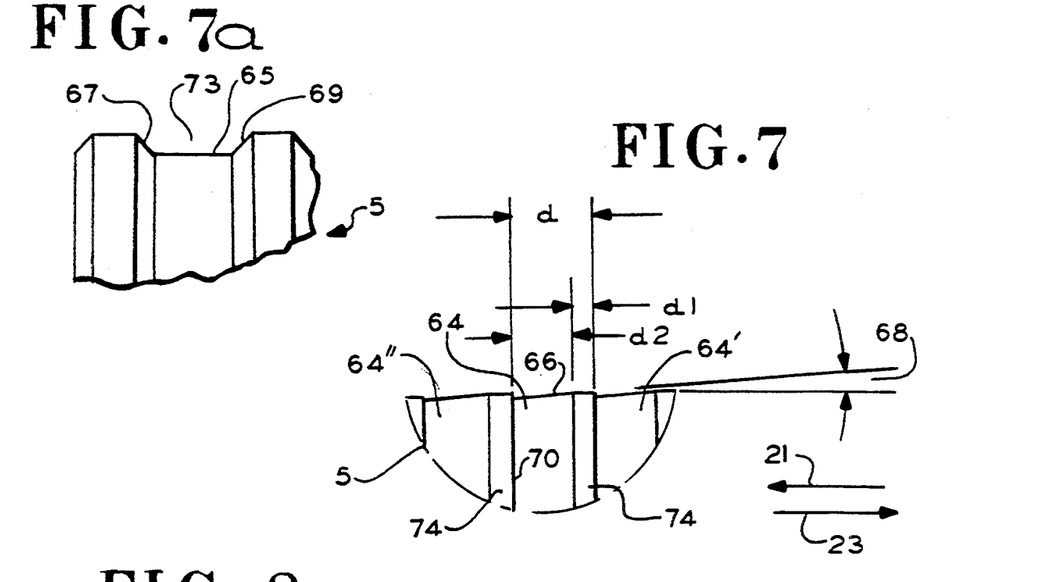
FIGS. 7 and 7a are enlarged detailed side elevation views of different preferred embodiments of a portion of the rod of FIG. 1 taken at region 7.

The rod 5, FIG. 1, includes a plurality of parallel identical annular peripheral grooves 64 which are equally spaced along axis 15. Each of the grooves 64 mate with and engage a ridge 50 of the gripping member 11, FIG. 6. Since the grooves 64 are all identical, a description of one groove 64 will be representative. In FIG. 7, each groove 64 has two side walls, one of which forms a ramp 66 which is inclined relative to axis 15, FIG. 1, at angle 68 and the other of which forms a shoulder 70. Angle 68 preferably is about 2.5° in this embodiment and is defined by the depth of shoulder 70 and length of ramp 66. The shoulder 70 has a surface which lies in a radial plane normal to axis 15 forming a step in the surface of rod 5. The shoulder 70 has a relatively steep rake as compared to the gradual rake of surface 66. Each groove 64 has an axial extent d2 which is sufficiently great to receive the crest 51 of a ridge 50. A circular cylindrical surface 74 having an axial extent d1 is between adjacent grooves 64. The dimension d2 preferably is about 50% greater than the transverse width 58 of each ridge 50 crest 51, FIG. 6. This is to allow each ridge 50 to engage the groove 64 so that a portion of surface 66 forms a side of the groove 64 for engaging the ridge 50. The dimension d1 for the shoulder 74 is of sufficient length to prevent the ridges 50 from wearing the rod surfaces as the ridges 50 slide in frictional engagement over the grooves 64.

When a crest 51 of a ridge 50, typically the ridge closest to end 42 of member 11, FIG. 6, engages a groove 64 of the rod 5, FIG. 7, the other ridges, because of their tapering angle 49 as compared to the axial cylindrical alignment of the grooves 64, may not be fully engaged with the grooves 64 or may be spaced therefrom. Thus, at least the end most one of the ridges 50 closest to end 42 is fully engaged with one of grooves 64. At least the ridge(s) adjacent to end 42 engaged in a corresponding groove 64 are somewhat resilient in a radial direction normal to axis 15a. When the end ridges 50 adjacent end 42 of member 11 are engaged with a respective groove 64, those ridges 50 can be radially resiliently displaced away from axis 15a and from the grooves 64 when the rod 5 is displaced in direction 21 relative to member 11. This radical displacement of end 42 occurs when the member 11 is stopped from displacing in direction 21 by housing 12, FIG. 1. At this time, the ridge 50 will ramp up the surface 66 over the surface 74 as the rod 5 is further displaced in direction 21 and then snaps into the next adjacent groove, for example, groove 64', FIG. 7. Prior to member 11 reaching the end of the bore 14 at end 29, the radial force of ridge 50 on groove 64 surface 66, even at 2.5°, is sufficient that the crest 51 edge of ridge 50 engages groove 64 surface 66 an amount sufficient so that displacement of rod 5 in direction 21 pulls the member 11 in direction 21.

When the rod 5 is displaced in direction 23, FIG. 7, the side 55, FIG. 6, of the ridge 50 in engagement with groove 64 abuts shoulder 70. Shoulder 70 prevents the ridge 50 from riding over the surface 74 onto the next adjacent groove 64", direction 21. This locks the member 11 relative to the rod 5 so that displacement of rod 5 in direction 23 pulls member 11 in this direction. However, this action as a condition thereof requires the member 11 not to resiliently displace radially out of groove 64 when rod 5 displaces. The radial resilient force is sufficiently high to permit this pulling action. Once the member is displaced to the right in bore 14, direction 23, the member 11 is locked against the rod 5 by the reduced diametrical spacing of the surface 20 of bore 14 and by the engaged ridge 50 and groove 64. This prevents disengagement of the ridge 50 from the groove 64.

The dimensional relationships of the rod 5 grooves 64 the ridges 50 and the member 11 in the casing 12 bore 14 are important. These dimensions are such that relative axial displacement of the member 11 in directions 21 and 23 in the bore 14 with a rod 5 present is limited to a relatively small distance, for example, 1/32 inches (0.8 millimeters). What is also significant is that no separate spring is required to force the member 11 in engagement with the grooves 64 of the rod 5. Because of the relatively high resilient radial force required to disengage the ridges 50 from grooves 64, no spring is required to displace the member 11 as the rod displaces and a relatively small axial displacement of the member 11 can be provided between the lock and unlocked member 11 positions. The housing 12 may have an axial length which is about 50% of the axial length of comparable housings of the prior art seals employing a spring operated gripping member.

In operation, when the rod 5, FIG. 1, is pulled to the right in the drawing in direction 23, the engagement of the member 11 ridges 50 with the rod 5 grooves 64 is such that the member 11 is pulled with the rod 5 to the right in direction 23. Due to the narrowing of the bore 14 due to its frustro-conical configuration, the segments 34, 36, FIG. 3, ridges 50 of the member 11 are precluded from radial displacement out of engagement with grooves 64. The greater the force that the rod 5 is pulled in the direction 23, the greater the forced engagement of the member 11 ridges 50 with the rod grooves 64 and the greater the locking action. In a test employing the embodiment described herein, the device 10 withstood an axial load of 14,000 lbs. (approx. 6,497 kilograms) at which load the head 7 broke free of the rod.

In FIG. 7a, a preferred embodiment for grooves 64 in the rod 5, FIG. 1, is shown. Representative groove 73 has a circular cylindrical bottom wall 65 and inclined side walls 67 and 69. The side walls 67 and 69 preferably are at 45° with axis 15 (FIG. 1), but may be at other angles; e.g., 90° to 30°. A ridge 50 mates with and engages the bottom wall 65 and side walls 67 and 69. In this case, the angles of walls 67 and 69 may be the same as that of ridges 50 and may have the same pitch. That is, wall 65 and crest 51 of ridges 50 may have the same axial extent, e.g., 0.020 inches (1 mm) with a pitch of 0.040 inches (2 mm).

In this embodiment groove 73 may have depth of 0.005 inches (0.13 mm) as compared to a depth preferably of about 0.001 inches (0.025 mm) for groove 64 of the FIG. 7 embodiment. Surface 66 in FIG. 7 has an axial extent d2 greater than crest 51 to provide a locking portion for the engaged ridge 50. For example, distance d2 may be about 0.030 inches (0.76 mm) and distance d1 may be about 0.010 inches (0.5 mm) to provide the 0.040 inch (2 mm) pitch. The grooves 64 and 73 may have a depth in the range of about 0.001 inches to about 0.030 inches.

The housing 12 circular cylindrical surface 16, FIG. 1, provides a region for axial displacement of the member 11 along axis 15. This axial dimension need not be large, but permits the axial displacement of the member 11 without providing an undesirable radial increasing clearance between the member 11 relative to the casing 12 which clearance might permit tumbling or inoperation of member 11 in bore 14.

Also, if the frustro-conical surface bore 14 were to continue through surface 16, the maximum diameter of bore 14 would be sufficiently great such as to preclude optimum operation of the device 10. The member 11 frustro-conical surface 38 has an angular extent relative to axis 15 (i.e., 1½°) which is about one half of the angular extent of bore 14, portion 18 (i.e., 3°). The reason for this difference in angle between the member 11 and the bore 14 is that if the member 11 were also ideally at a 3° angular extent, the length of the member 11 could not be the desired ½ inch length described, but would have to be about half of that length or ¼ inches (6.4 mm). The member 11 for identical angles would need additional axial distance to displace between the free position at end 29 and the locked position toward end 13 for the one half inch member 11 length.

The smaller axial length of one quarter of an inch of the member 11 also is such that the member 11 might cock within the bore 14 and be inoperative. If the relative dimensions, i.e., the bore 14 and member 11 angles are the same, the member 11 would need to move axially double the distance as compared to the present implementation and thus use more material for the housing 12 which is less desirable. The resulting dimensions described herein while not critical to its operation are important with respect to providing a compromise of an ideal combination of operability and minimum material. Thus, by making the angle 45, FIG. 6 of the member 11 preferably 1½° and the angle 25 of the bore 14 3°, optimal comprise of length, diameter and operability and maximum locking action is provided.

The shoulder 26, FIG. 8, of the housing 12 is provided to align the rod. 5 on axis 15. By way of example, the rod 5 may have an 0.373 inch diameter (9.5 millimeters). The shoulder 26 of housing 12 may have an 0.380 inch (9.7 millimeter) diameter which is a circular cylindrical surface. This surface aligns rod 5 approximately parallel to axis 15 when it is inserted into the bore 14. It should be recalled that the rod 5 is inserted into end 13 of the bore 14 in direction 21, FIG. 1. The internal diameter of surface 16 at the opposite end 29 is also the same as the diameter of shoulder 26.

Figure 5:
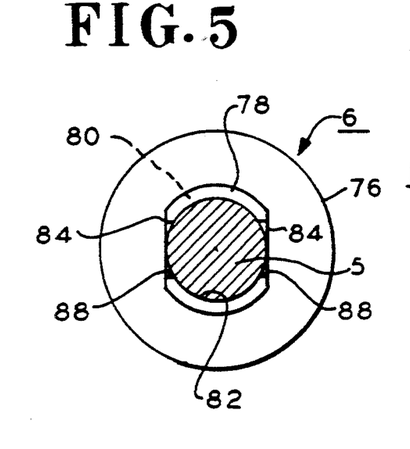
FIG. 5 is an end sectional elevation view of the device of FIG. 1 taken along lines 5—5.

In FIGS. 1 and 5, spacer 6 is provided to space the head 7 from the next adjacent hasp 8a. The spacer 6 is molded thermoplastic having a circular flange 76 and first and second cylindrical members 78 and 80. Members 78 and 80 are identical and therefore a description of member 78 is representative. The spacer 6 flange 76, and members 78 and 80 have a common circular cylindrical bore 82 which is in sliding engagement with the peripheral surface of the rod 5 at which surface there are no grooves 64. Member 78 has two oppositely disposed planar side walls 84 in which there is an axially extending slot 88. The remainder of member 78 is of circular cylindrical section. The spacer 6 provides a spacing between the head 7 and the next adjacent hasp 8a, FIG. 1, for purposes of permitting a tool 90, FIG. 9, remove the head 7 by an authorized user. The surfaces 88 of spacer 6 permit a conventional tool 90 to be used in the device of the present embodiment.

Figure 9:
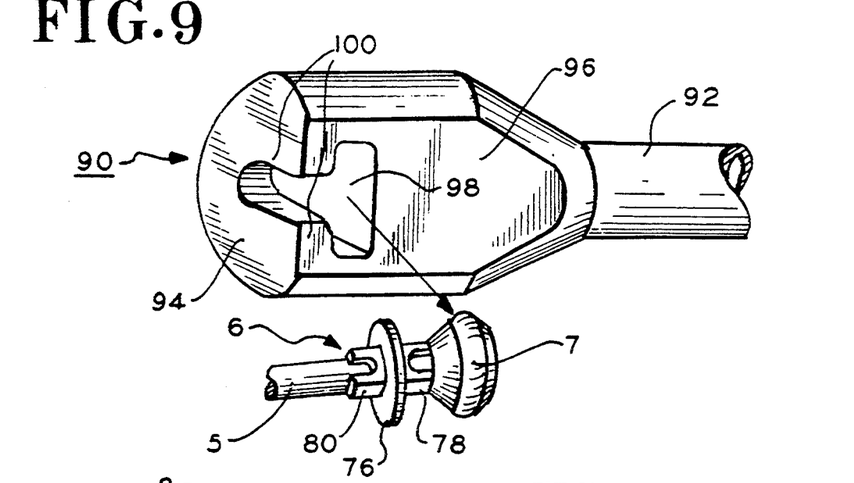
FIG. 9 is an exploded isometric view of a tool and head end of the rod of the embodiment of FIG. 1 without the hasps shown for purposes of removing the head to free the rod to remove the device from the hasps.
Figure 10:
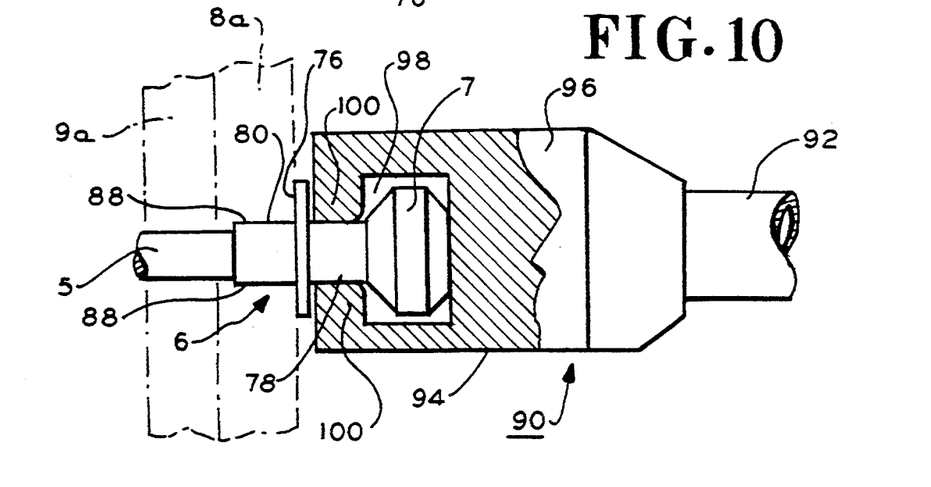
FIG. 10 is a side elevation partially in section view of the head and rod portion of FIG. 9 with the tool of FIG. 9 engaged with the rod and head for purposes of severing the head from the rod.

In FIG. 9, tool 90 comprises a shank 92 and a socket 94. The socket 94 is an enlarged circular cylindrical member having a planar side face 96. A T-shaped slot 98 is formed in communication with the planar side face 96. The slot 98 is dimensioned to receive the head 7 and the member 78 of the spacer 6. This is best seen in FIG. 10. The slot 98 is formed by a pair of legs 100 at the base of the socket 94. The legs 100 fit in the axially extending space provided by the spacer member 78 between the head 7 and the flange 76, otherwise the head 7 may abut the hasp 8a.

Figure 11:
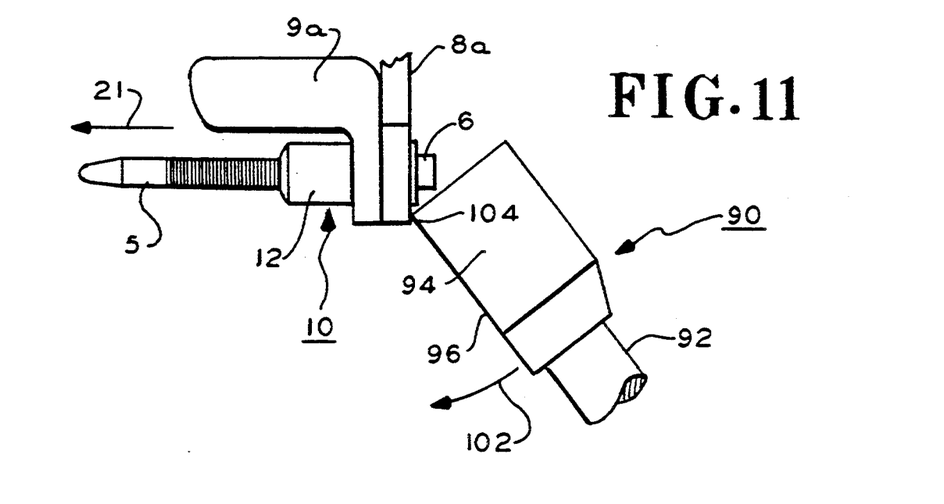
FIG. 11 illustrates the device of FIG. 1 with the head portion severed from the device by the tool of FIGS. 9 and 10.

Once the slot 98 is engaged with the head 7, FIG. 10, the tool 90 is then torqued in direction 102, FIG. 11, pivoting about point 104. The length of the shank 92 is such that sufficient manual torque is provided about point 104 for severing the head 70 at one of the serrations 62. Once the head 7 is severed from the rod 5, the rod 5 may be pulled from the spacer 6 and housing 12 in direction 21, FIG. 11, releasing the device 10 from the hasps 8a and 9a. The housing 12 is then removed from the rod 5 by displacing the rod 5 further in direction 21 relative to the housing 12. The rod 5 and the severed head are discarded. The housing 12 is then reused with a new rod 5 assembly with a head 7 attached thereto. The spacer 6 is assembled to the rod 5 by slipping the spacer over the free end of the rod opposite the head 7. With the spacer 6 next adjacent to the head 7 as shown in FIG. 9, the rod is attached to the hasps and the seal device housing 12 and member 11 contained therein are then slipped over the rod 5 in direction 23, FIG. 1, for locking hasps 8a and 9a with a new rod assembly.

The steel rod 5 provides a relatively strong deterrent to unauthorized tampering. The housing 12 being formed of hardened steel is difficult to tamper with. The relatively close fit of the bore 14 at ends 13 and 29 of the housing 12 to rod 5 precludes insertion of a tampering tool in an attempt to free the member 11 from the rod 5.

As thus has been shown, a relatively simple, low-cost rod and seal arrangement comprises a rod with grooves which engage the ridges on a resilient gripping member of the seal causing the gripping member to be pulled with the rod as the rod is pulled in the seal bore. As the rod is further pulled, the housing restrains further displacement of the member 11 and the ridges resiliently disengage the rod grooves. The rod can be pulled through the seal bore in only one way as in the other way, the gripping member 11 is pulled with the rod and lodged in bore 14 which locks the member ridges in engagement with the rod grooves.

It is preferred that the member 11 be stamped case hardened steel and that it is harder than the rod 5. For example, the member 11 may be formed of cold rolled steel 1018 of 0.047 inch (1.2 mm) wall thickness. The material is then case hardened to 0.03 to 0.005 inch deep. The member is then finished with a CAD plating with a clear, chromate finish. Because the member 11 is formed by a stamping operation, a die used to form the ridges 50 of the member 11 may comprise a male member with saw tooth shaped teeth subtending a 90° angle. This provides for simplified fabrication of a member 11. The 45° angle of the ridges 50 is preferred for ease of manufacture for use with the above fabricated die. Other angles of the ridges 50 in other implementations would function equally well, the 45° angle being a matter of convenience. The depth dimension 45 of the ridges 50 of the member 11 is relatively shallow, e.g., 0.010 inches (0.25 mm). Because the member 11 is of hardened steel and the crests of the ridges 50 are relatively flat, these ridges exhibit negligible wear as compared to that of a rod 5 which is of softer material. The member 11 and housing 12 form a reusable assembly. The hardened housing 12 precludes damage from the hardened member 11. It is desirable that the member 11 not exhibit significant wear in use.

In contrast, the rod 5 is an expendable item since it is used once in a locking arrangement and then when the head 7 is severed therefrom, the rod is discarded. Therefore, possible wear of the grooves 64 of the rod 5 is not a factor in making the rod of softer material. The grooves 64, FIG. 7, of the rod 5 have a relatively shallow shoulder 70 which preferably lies in a range of 0.001 to 0.006 inch (0.025 to 0.12 millimeters). This relatively shallow depth surprisingly provides excellent grasping action when engaged by the ridges 50 of the member 11. The sides of the ridges 50 of the member 11 are forced against the shoulder 70 even though relatively shallow as described and lock there against. The reason for this locking is that the member 11 segments 34 and 36 ridges 50 FIGS. 2 and 3, have an internal diameter that is approximately the same as that as the external diameter of the grooves 64 at a region adjacent to shoulder 70, FIG. 7, and grooves 73 in the embodiment of FIG. 71.

For example, the internal diameter of the ridges 50 of member 11 at the smallest dimension may lie in a range of 0.366 to 0.370 inch (9.3 to 9.4 millimeters). In contrast, the external diameter of the rod 5 at surfaces 74 is nominally 0.373 inch (9.5 millimeters). The root of the grooves 64 and 73 at their minimum dimension is approximately the same as the internal diameter of the ridges 50 crests 51 next adjacent to end 42 of the member 11. The tendency of the member 11 ridge 50 at this location is to abut surface 66 and wall 65 of each groove 64 and 73, respectively, of the rod 5. Therefore, to disengage a ridge 50 requires that ridge 50 to be resiliently radially displaced outwardly from the groove. This radial displacement occurs only in response to a relatively high axial displacement force, e.g., 5 LB (2.3 Kg) in this embodiment.

The relatively high displacement force is provided by the segments 34 and 36 each subtending a circular arc of preferably about 110° which makes the end 42 of the member 11 relatively rigid in the radial direction even though cantilevered in comparison to a flat member of the same length as segments 34 and 36. The segments 34 and 36 thus exhibit higher resistance to radial resilient displacements. For example, if the segments 34 and 36 are replaced by a tube, no significant resilient radial displacement would occur. Therefore, the greater the arc subtended by segments 34 and 36, the stiffer the segments and the higher the resilient load provided by these segments at end 42 in response to an axial displacement force.

Depending on the resilient radial forces desired, the angular extent of segments 34 and 36 may be increased or decreased according to a given implementation. For the material given for member 11, and the dimensions given in the examples given hereinabove, an axial insertion force in the direction of axis 15 of about 5 pounds (2.3 kilograms) is preferably provided the member 11 on rod 5. However, an insertion force of lower or higher value may be provided in accordance with a given implementation. This insertion force corresponds to the load provided by the ridges 50 necessary to disengage these ridges from the rod grooves 64 or 73. Because of this relatively high disengagement load, the relatively shallow depth of the rod grooves 64 provide acceptable engagement with the member 11 ridges and the necessary grabbing action so that member 11 is pulled by the rod in a desired direction by the rod. There is also a relatively small axial displacement of member 11 to place the member 11 in either the locking position where it is wedged against the smaller diameter of the bore 14 toward end 13 or a slipping position for permitting the rod to slip through the member 11 at the opposite end 29 at the larger diameter of bore 14.

While two segments 34 and 36 are illustrated in the present embodiment, it should be apparent to one of ordinary skill that more or fewer segments may be provided in accordance with a given implementation. To provide more than two segments, such as segments 34 and 36, would provide less resistance in attempting to free the rod from the locking action of the sealed device. To provide more segments is a matter of manufacturing convenience as it is more costly to stamp a number of fingers or segments from sheet metal and meet the required tolerances than relatively larger arc segments. Further, providing more segments reduces their arc angle as discussed above, therefore resulting in such segments being more resilient than the segments 34 and 36 of the present embodiment. While two segments 34 and 36 are preferred, it is contemplated that the device will also operate with one segment.

While particular embodiments of the present invention have been described, it should be understood that it is intended that such embodiments not be limiting, that modifications may be made to the disclosed embodiments and that the scope of the invention is as defined in the appended claims.

What is claimed is:

1. A locking device for securing a pair of hasps comprising:
    an elongated cylindrical rod having a longitudinal axis including a head secured thereto, said rod having an array of axially spaced circumferential grooves of like dimension, each groove having first and second side walls;
    a housing having a bore therethrough for receiving the rod, at least a portion of the housing bore being frustro-conical, the housing bore having proximal and distal ends, the housing bore proximal end being larger than the housing bore distal end; and
    a rod clamping member in the housing bore having an arcuate section of sufficient angular extent so as to receive and be retained on the rod in a direction transverse the axis and for axial displacement along the axis and at least one segment cantilevered from the member arcuate section toward the housing bore distal end, the arcuate section and the one segment lying on a frustro-conical surface of revolution having respective larger and smaller outer diameters at opposite clamping member ends, the clamping member being axially displaceable to a first lock position and to a second unlock position in the housing bore, the first lock position being closer to the housing bore distal end than the second unlock position, the one segment at an end distal the arcuate section having at least one ridge facing and in resilient engagement with one of the rod grooves, each at least one ridge for engaging a rod groove respective corresponding first and second sidewalls, the resilient radial of force of the at least one ridge on the engaged rod groove is of such magnitude that axial displacement of the rod causes the engaged at least one ridge to be pulled by the rod in first and second opposing directions, the housing bore and clamping member dimensions are such that when the clamping member is pulled in the first direction to the first lock position, the housing radially locks the at least one ridge in the engaged rod groove and when the clamping member is pulled in the second direction to the second unlock position by the rod, the at least one ridge is free to resiliently radially disengage from that engaged rod groove in response to further relative axial displacement of the rod in the second direction.

2. The device of claim 1 wherein said clamping member is stamped sheet steel.

3. The device of claim 2 wherein the clamping member is hardened steel having a hardness greater than that of the rod.

4. The device of claim 1 wherein the housing bore frustro-conical portion at its smaller diameter receives said clamping member smaller outer diameter and is sufficiently small relative to said clamping member smaller outer diameter so as to preclude resilient displacement of said ridge out of said engaged groove and said housing bore at its larger diameter receives the clamping member large diameter and is sufficiently large relative to the clamping member larger outer diameter so as to permit said clamping member to axially displace toward the housing bore larger diameter and also permit resilient displacement of said at least one ridge out of the engaged groove in response to the relative axial displacement of said rod toward the housing bore larger diameter.

5. The device of claim 4 wherein the bore of the housing includes a circular cylindrical portion of about the same diameter as and contiguous with said frustro-conical housing bore portion larger diameter.

6. The device of claim 1 wherein the housing bore has an axis, said housing has opposing ends, each end having an annular shoulder of reduced diameter relative to the housing bore for closely receiving and aligning the rod on the bore axis.

7. The device of claim 1 wherein the rod has an outer surface which is a circular cylinder of a given diameter, said grooves being formed in said outer surface and having a given diameter, said clamping member at least one ridge having a diametrical dimension smaller than said groove given diameter.

8. The device of claim 1 further including a hollow spacer for receiving the rod therethrough and located between the rod head and the housing for spacing the rod head from the hasps in the first lock condition.

9. The device of claim 1 wherein the first side wall lies on a surface at an angle in the range of about 30° to normal to the longitudinal axis and the second side wall lies on a surface at an angle in the range of about 1° to 60° with said longitudinal axis.

10. The device of claim 9 wherein the rod has a circular cylindrical shoulder between each of the grooves.

11. The device of claim 1 wherein each of the rod grooves second side wall forming a ramp extending from the corresponding groove first side wall, the at least one ridge has a width along said axis less than the length of the second side wall of each said groove along said axis.

12. The device of claim 1 wherein the first and second groove side walls extend generally radially outwardly relative to the axis, the groove side walls each having a depth which is in the range of about 0.001 to 0.020 inches (0.25 to 0.5 millimeters).

13. The device of claim 1 wherein the at least one ridge has side walls inclined relative to said longitudinal axis.

14. The device of claim 13 including a head secured to the rod at one end thereof, the head being dimensioned and located to provided limited relative displacement of the rod in the second direction, the housing being dimensioned for precluding displacement of the rod clamping member beyond the first and second positions in the bore.

15. A device for locking thereto a cylindrical rod axially extending along a longitudinal axis, said rod comprising a plurality of spaced first annular grooves, each extending circumferentially about the rod longitudinal axis, each groove having first and second side walls, said grooves being engageable by said device for providing one way axial relative displacement of the rod to said device, said device comprising:

a housing having a longitudinally extending bore therethrough for receiving said rod, said housing bore having a tapered portion forming a frustro-conical surface of revolution having a distal end and a relatively wider proximal end; and a rod gripping member comprising at least one frustro-conical segment axially extending between a first end lying on a smaller diametrical dimension of a frustro-conical surface of revolution and a second end lying on a relatively larger diametrical dimension of said surface of revolution, said first end being radially resilient, said rod gripping member having an external surface dimensioned to be received in and axially displaceable in said housing bore, said rod gripping member having an internal surface formed with at least one radially extending ridge, said at least one ridge being dimensioned to mate with and selectively engage each of said rod grooves, the engaged at least one ridge and groove being dimensioned to axially pull the one ridge and rod gripping member relative to and within the housing bore in response to axially displacing the rod to axially place the gripping member in spaced lock and unlock positions, said housing bore being dimensioned to lock the engaged ridge in the corresponding groove in the gripping member lock position and to permit the engaged ridge to resiliently displace out of the corresponding groove in the gripping member unlock position.

16. The device of claim 15 wherein said rod gripping member comprises stamped sheet metal.

17. The device of claim 15 wherein the rod gripping member comprises a C-shaped section at the second end and a pair of said at least one frustro-conical segment in spaced opposing relation cantilevered from said section arranged to engage opposite sides of said rod.

18. The device of claim 17 wherein the pair of at least one frustro-conical segment have a plurality of like opposing axially spaced ridges.

19. The device of claim 18 wherein the rod spaced first annular grooves each have a bottom wall of a given axial extent said ridges having an axial extent which is about the same as the axial extent of said bottom wall.

20. A device for locking an elongated cylinder thereto having a plurality of axially spaced grooves comprising:

a housing having a longitudinally extending bore for receiving said cylinder therethrough, said housing bore having opposing ends and a frustro-conical surface portion in which one end of the housing bore is of larger diameter than the other opposing bore end; and a frustro-conical clamp member comprising a C-shaped section and a pair of spaced arcuate segments adapted to receive the rod, said segments being cantilevered from the C-shaped section and dimensioned to mate with and be received in said bore frustro-conical surface portion, each said segments having arcuate opposing facing axially spaced ridges at least the cantilevered end thereof, said ridges for engaging said axially spaced grooves, said housing bore having a reduced diameter at each bore end for securing the clamp member in said housing bore, said clamp member and housing bore being dimensioned to permit axial displacement of the clamp member in the housing bore to wedge the spaced arcuate segments against the housing bore frustro-conical surface portion when the clamp member is at the other end and for permitting the ridges of the arcuate segments at the cantilevered end to resiliently displace radially outwardly out of engagement with said grooves when the clamp member is at the one end, said ridges being arranged such that axial displacement of the rod pulls the engaged member with the rod toward said housing bore one and other opposing ends whereby the ridges are locked in engagement with grooves when located at said other housing opposing bore end and free to resiliently displace out of engagement with the grooves at the housing one bore end.

21. The device of claim 20 wherein the frustro-conical clamp member is stamped from flat steel sheet and case hardened.

22. The device of claim 20 wherein the housing is case hardened steel.

23. A rod for use with a locking device, said device including a housing having a bore extending therethrough, at least a portion of the bore being frustro-conical, said portion of the bore having a smaller diameter end and an opposite larger diameter end, the device including a frustro-conical clamping member secured in the bore for axial displacement therein and including a C-shaped section for receiving the rod and at least one segment cantilevered from the C-shaped section over lying the receiving rod, the at least one segment having a cantilevered end, the segment having radially inwardly extending ridges axially spaced along the longitudinal axis of the rod as set forth below and being radially resilient at the cantilevered end, said rod comprising:

an elongated cylindrical shaft having a longitudinal axis, said shaft having first and opposite second ends and a plurality of axially spaced-like circumferential grooves, each groove for receiving a ridge, said grooves being dimensioned relative to the ridges so that the ridges are normally engaged therewith and adapted relative to the ridges for axially pulling the frustro-conical clamping member in said bore in opposing directions such that when the clamping member is pulled to the smaller diameter bore end, the ridges are locked in the grooves and when the member is pulled to the opposite larger diameter bore end, the ridges can resiliently displace out of engagement with said grooves; and a head larger than said bore secured to the shaft.

24. A self-locking reusable seal device comprising:

a housing having a frustro-conical bore, the bore having reduced diameters at opposing ends;

a rod having a plurality of one of circumferential axially spaced like grooves or ridges, said rod for being received through the bore in close engagement with said reduced diameter bore ends; and a frustro-conical gripping member including a section at one member end shaped to grip the rod in a direction transverse to the rod length and for displacing axially along the rod and at least one cantilevered segment having at least one of the other of said grooves and ridges for engagement with any of said rod grooves or ridges, said engagement being such that axial displacement of the rod pulls the member therewith, said one member end being radially resilient, said bore, rod grooves and ridges being dimensioned so that the bore locks the at least one ]ridge in engagement with a corresponding groove when the member is at the one bore end and permits radial resilient disengagement of the at least one ridge and engaged groove when at the other bore end.

* * * * *